US011950537B2

(12) United States Patent
Steidinger et al.

(10) Patent No.: US 11,950,537 B2
(45) Date of Patent: Apr. 9, 2024

(54) AUTOMATED ROLL CONDITIONER ADJUSTMENT SYSTEM FOR AN AGRICULTURAL HARVESTING MACHINE

(71) Applicant: CNH Industrial America LLC, New Holland, PA (US)

(72) Inventors: Benjamin Steidinger, Germansville, PA (US); Jeffrey B. Fay, II, Oxford, PA (US); Kevin M. Smith, Narvon, PA (US); Jeffrey Laux, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 290 days.

(21) Appl. No.: 17/324,810

(22) Filed: May 19, 2021

(65) Prior Publication Data

US 2021/0360857 A1 Nov. 25, 2021

Related U.S. Application Data

(60) Provisional application No. 63/027,015, filed on May 19, 2020.

(51) Int. Cl.
*A01D 82/02* (2006.01)
*A01D 43/10* (2006.01)

(52) U.S. Cl.
CPC ........... *A01D 82/02* (2013.01); *A01D 43/102* (2013.01)

(58) Field of Classification Search
CPC ....... A01D 82/02; A01D 43/10; A01D 43/102
See application file for complete search history.

(56) References Cited

U.S. PATENT DOCUMENTS

| 3,513,645 | A | * | 5/1970 | Garrett | ................... | A01D 82/00 56/1 |
| 4,472,927 | A | * | 9/1984 | Vogt | ....................... | A01D 82/00 56/DIG. 1 |
| 5,033,257 | A | * | 7/1991 | Walters | ................ | A01D 43/107 100/169 |

(Continued)

FOREIGN PATENT DOCUMENTS

| EP | 1166619 A1 | 1/2002 |
| EP | 3400780 A1 | 11/2018 |
| EP | 3400782 A1 | 11/2018 |

OTHER PUBLICATIONS

Extended European Search Report for EP Application No. 21174296.0 dated Oct. 15, 2021 (seven pages).

*Primary Examiner* — Abigail A Risic
(74) *Attorney, Agent, or Firm* — Peter K. Zacharias (57) ABSTRACT

A crop conditioning device for an agricultural harvesting machine. The crop conditioning device includes a frame, a first conditioning roll connected to the frame, and a second conditioning roll connected to the frame such that the second conditioning roll is movable relative to the first conditioning roll. The crop conditioning device also includes a tension mechanism connected to the second conditioning roll. The crop conditioning device also includes a roll-gap mechanism connected to the second conditioning roll. The crop conditioning device also includes a controller which is configured for automatically setting at least one of an initial tension force and an initial roll gap dependent upon at least one of a type of crop material and at least one operational setting.

18 Claims, 6 Drawing Sheets

(56) References Cited

U.S. PATENT DOCUMENTS

| | | | | |
|---|---|---|---|---|
| 5,435,239 A | * | 7/1995 | Talbot | A01D 82/02 |
| | | | | 99/523 |
| 5,531,062 A | * | 7/1996 | Pfrimmer | B02C 4/32 |
| | | | | 56/10.2 J |
| 6,050,070 A | * | 4/2000 | Cook | A01D 82/00 |
| | | | | 56/16.4 C |
| 6,131,837 A | * | 10/2000 | Wanner | A01D 43/086 |
| | | | | 241/294 |
| 6,425,232 B1 | * | 7/2002 | Desnijder | A01D 82/02 |
| | | | | 56/16.4 B |
| 6,499,283 B1 | * | 12/2002 | Cook | A01D 82/02 |
| | | | | 56/16.5 |
| 6,715,271 B2 | * | 4/2004 | Mellin | A01D 82/00 |
| | | | | 56/16.4 B |
| 8,056,309 B2 | | 11/2011 | Vandendriessche | |
| 8,056,311 B1 | * | 11/2011 | Barnett | A01D 82/00 |
| | | | | 56/16.4 B |
| 9,707,972 B2 | | 7/2017 | Tuncer et al. | |
| 10,251,340 B2 | | 4/2019 | Roberts et al. | |
| 11,477,941 B2 | * | 10/2022 | Bode Mortensen | A01D 43/102 |
| 2005/0126147 A1 | | 6/2005 | Nickel et al. | |
| 2006/0123759 A1 | * | 6/2006 | Fox | A01D 82/02 |
| | | | | 56/16.4 C |
| 2018/0325028 A1 | | 11/2018 | Rotole et al. | |
| 2018/0325029 A1 | * | 11/2018 | Rotole | A01D 57/26 |
| 2018/0325032 A1 | * | 11/2018 | Rotole | G05D 1/0278 |
| 2018/0328470 A1 | | 11/2018 | Rotole et al. | |
| 2019/0116733 A1 | | 4/2019 | Wire et al. | |
| 2020/0205345 A1 | * | 7/2020 | Bollinger | A01D 57/26 |
| 2023/0038553 A1 | * | 2/2023 | Steidinger | A01D 82/00 |

\* cited by examiner

AUTOMATED ROLL CONDITIONER ADJUSTMENT SYSTEM FOR AN AGRICULTURAL HARVESTING MACHINE

BACKGROUND OF THE INVENTION

The present invention pertains to agricultural harvesting machines and, more specifically, to a roll-type conditioner for an agricultural harvesting machine.

Agricultural harvesting machines may include self-propelled windrowers or pull-type mower conditioners. Farmers may operate such mowing devices to cut crop material, such as hay or grass, from a field and subsequently deposit the cut crop into windrows on the field. The windrows may be left on the field to dry out the crop in the sun. Thereafter, farmers may bale the cut crop material with a baler, such as a large square baler or round baler, which straddles the windrows and travels along the windrows to pick up the crop material and form it into bales.

A typical self-propelled windrower includes a chassis, a prime mover, wheels, and a detachable header. The header generally includes a cutter bar and a conditioner assembly. The cutter bar can be a rotary cutter bar with rotating discs or a sickle-type cutter bar with reciprocating knives.

A typical pull-type mower conditioner includes a frame, a hitch coupled to the towing vehicle, a cutter bar, and a conditioner assembly. The mower conditioner may further include other elements such as a reel to assist crop feeding and an auger or belts to convey crop to a central discharge point.

A conditioner assembly of a self-propelled windrower or pull-type mower conditioner generally includes two or more conditioning rolls for conditioning the crop material. The conditioning rolls are located adjacent to one another such that a gap forms therebetween. This gap in between the paired conditioning rolls helps to define the size of the crop mat which passes therethrough. As the crop passes through this gap, the conditioning rolls apply opposing tangential forces that condition or otherwise crush the crop material. The extent of conditioning is based in part on the size of the gap and the tension holding the conditioning rolls in place. Overtime, the surface of the conditioning rolls will wear, thus increasing the size of the gap and causing suboptimal conditioning of the crop material. As can be appreciated, suboptimal conditioning may negatively impact the drying time of the cut crop, tonnage, and/or feed quality.

Current conditioning assemblies require an operator to manually set the gap size and tension of the conditioning rolls. The gap size can be set by adjusting a nut on a limiting rod coupled to one of the conditioning rolls. The tension can be set by turning a crank that variably biases one conditioning roll toward the other conditioner roll. However, it may be difficult for the operator to manually adjust these parameters, especially if certain components have become corroded or stuck due to crop buildup. Also, such adjustments may not be able to be accurately verified since the operator may not be able to visually inspect the gap size or roll tension. Thereby, the manual adjustment of the conditioning rolls can be difficult, time-consuming, and potentially inaccurate.

What is needed in the art is a cost-effective and automatically adjustable crop conditioner.

SUMMARY OF THE INVENTION

In one exemplary embodiment formed in accordance with the present invention, there is provided a crop conditioning device that generally includes at least two conditioning rolls, a tension mechanism, a roll-gap mechanism, and a controller operably connected to the tension and roll-gap mechanisms. The controller automatically sets an initial tension force and an initial roll gap dependent upon one or more of a crop material characteristic and/or an operational setting. The controller may also actively monitor the tension force and roll gap and accordingly automatically adjust the tension force and roll gap.

In another exemplary embodiment formed in accordance with the present invention, there is provided a crop conditioning device for an agricultural harvesting machine. The crop conditioning device includes a frame, a first conditioning roll connected to the frame, and a second conditioning roll connected to the frame such that the second conditioning roll is movable relative to the first conditioning roll. The second conditioning roll is located at a distance away from the first conditioning roll for defining a roll gap in between the first conditioning roll and the second conditioning roll. The first conditioning roll and the second conditioning roll are configured for conditioning a crop material. The crop conditioning device also includes a tension mechanism connected to the second conditioning roll. The tension mechanism is configured for applying a tension force on the second conditioning roll. The crop conditioning device also includes a roll-gap mechanism connected to the second conditioning roll. The roll-gap mechanism is configured for moving the second conditioning roll to adjust the roll gap. The crop conditioning device also includes a controller operably connected to at least one of the tension mechanism and the roll-gap mechanism. The controller is configured for automatically setting at least one of an initial tension force and an initial roll gap dependent upon at least one of a type of crop material and at least one operational setting.

In yet another exemplary embodiment formed in accordance with the present invention, there is provided a method for operating an agricultural harvesting machine. The method includes an initial step of providing a crop conditioning device for the agricultural harvesting machine. The crop conditioning device includes a frame, a first conditioning roll connected to the frame, and a second conditioning roll connected to the frame such that the second conditioning roll is movable relative to the first conditioning roll. The second conditioning roll is located at a distance away from the first conditioning roll for defining a roll gap in between the first conditioning roll and the second conditioning roll. The first conditioning roll and the second conditioning roll are configured for conditioning a crop material. The crop conditioning device also includes a tension mechanism connected to the second conditioning roll. The tension mechanism is configured for applying a tension force on the second conditioning roll. The crop conditioning device also includes a roll-gap mechanism connected to the second conditioning roll. The roll-gap mechanism being configured for moving the second conditioning roll to adjust the roll gap. The crop conditioning device also includes a controller operably connected to at least one of the tension mechanism and the roll-gap mechanism. The method includes a further step of determining, by the controller, a type of crop material and a stem diameter of the crop material. The method includes another step of setting, by the controller, at least one of an initial tension force dependent upon the type of crop material and an initial roll gap dependent upon the type of crop material.

One possible advantage of the exemplary embodiment of the crop conditioning device is that the controller can maintain a desired conditioning quality by automatically adjusting the roll tension and/or the size of the roll gap, irrespective of the skill of the operator.

Another possible advantage of the exemplary embodiment of the crop conditioning device is that the controller may optimize the conditioning performance by monitoring the operational roll gap and subsequently adjusting the tension force to maintain the desired operational roll gap, depending upon the real-time average deviation and the standard deviation of the roll gap.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural harvester or mowing device and/or components thereof are usually determined with reference to the direction of forward operative travel, but they should not be construed as limiting. The terms "longitudinal" and "transverse" are determined with reference to the fore-and-aft direction of the agricultural vehicle or mowing device and are equally not to be construed as limiting. The terms "downstream" and "upstream" are determined with reference to the intended direction of crop material flow during operation, with "downstream" being analogous to "rearward" and "upstream" being analogous to "forward." The term "agricultural harvesting machine" may refer to any desired machine which cuts crop material from a field, such as a self-propelled windrower or a mower conditioner. The term "crop conditioning device" may refer to a roll-type conditioner that is usable in a self-propelled windrower, a pull-type mower conditioner, or any other desired machine. The term "operational setting" may include any desired adjustable variable of the header and/or conditioner, including the rotational speed of the conditioning rolls, the conditioning roll gap size, the tension force on the conditioning rolls, the position of the swath forming shields of the exit gate, the cutter bar speed, the cutter bar height, the cutter bar angle, and/or the windrow merger status. The term "operational roll gap" may refer to the roll gap during operation of the crop conditioning device, wherein the roll gap naturally fluctuates due to variations in the crop mat passing in between the conditioning rolls. The operation of the crop conditioning device may include an operation wherein the crop conditioning device and/or the conditioning rolls are stationary, wherein the header is raised, and/or wherein the crop conditioning device is presently moving with the conditioning rolls actively rotating. The term "initial" as used herein to describe the various settings may refer to a first or subsequent setting upon which other settings may be adjusted relative thereto.

Referring now to the drawings, and more particularly to FIGS. 1-5, there is shown an agricultural harvester 100 which generally includes a chassis, a prime mover, wheels and/or tracts, a cab for housing the operator, an optional reel, and a header 110 removably connected to and supported by the chassis. The agricultural harvester 100 may be in the form of any desired agricultural vehicle, such as a self-propelled windrower.

Figure 1:
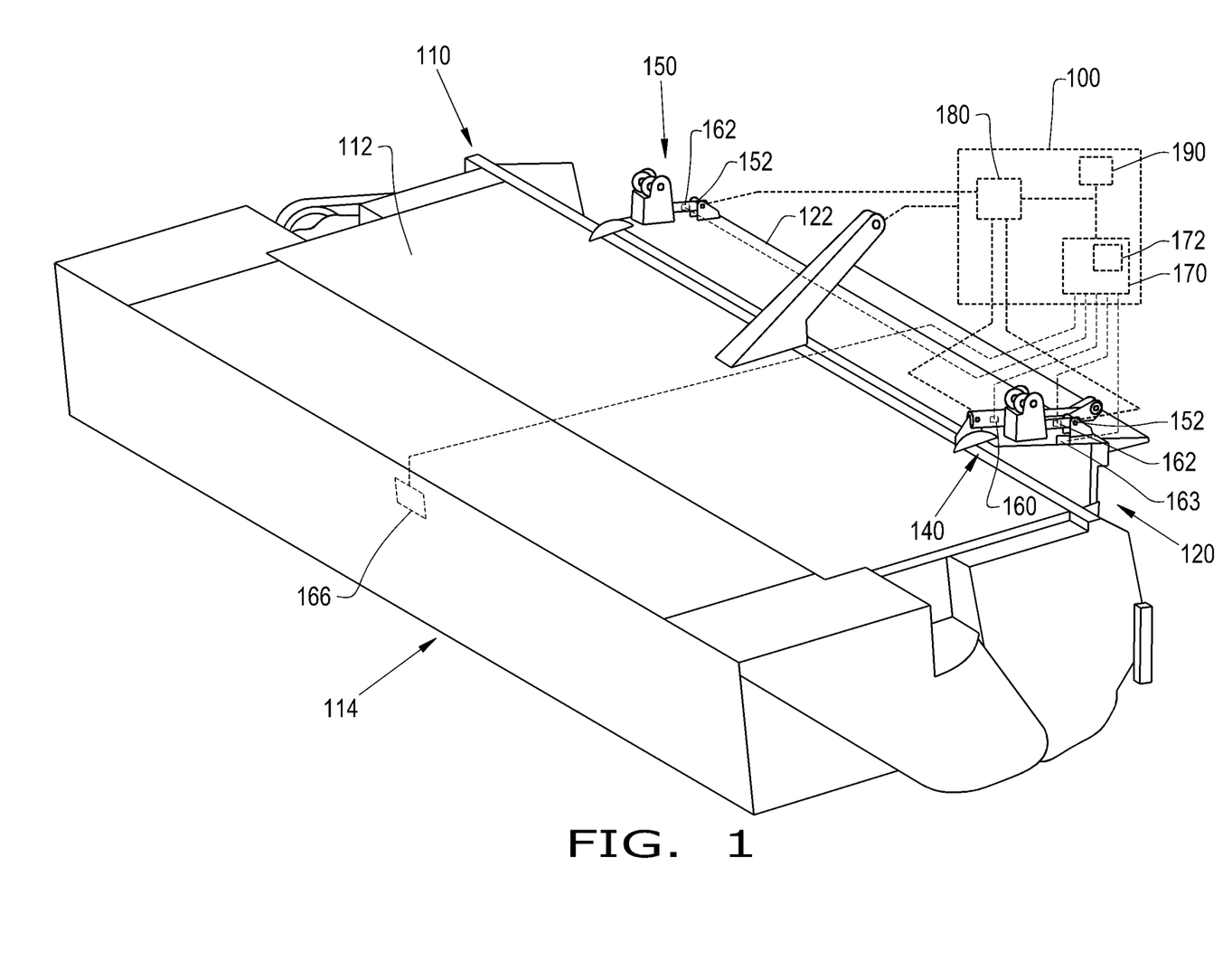
FIG. 1 illustrates a perspective view of an exemplary embodiment of a header for an agricultural harvester, the header including a crop conditioning device, in accordance with an exemplary embodiment of the present invention.

The header 110 may cut the crop from the field, condition the crop material, and deposit the conditioned crop material back onto the field in a windrow or swath. The header 110 generally includes a main frame 112, a cutter bar 114, a crop conditioning device 120, and an exit gate with swath forming shields.

The cutter bar 114 cuts the crop from the field. The cutter bar 114 may be located at the front of the main frame 112. The cutter bar 114 may be in the form of any desired cutter bar 114, such as a sickle bar or rotary disc cutter bar. For example, cutter bar 114 may be in the form of a rotary disc cutter bar with multiple cutting disc heads.

Figure 2:
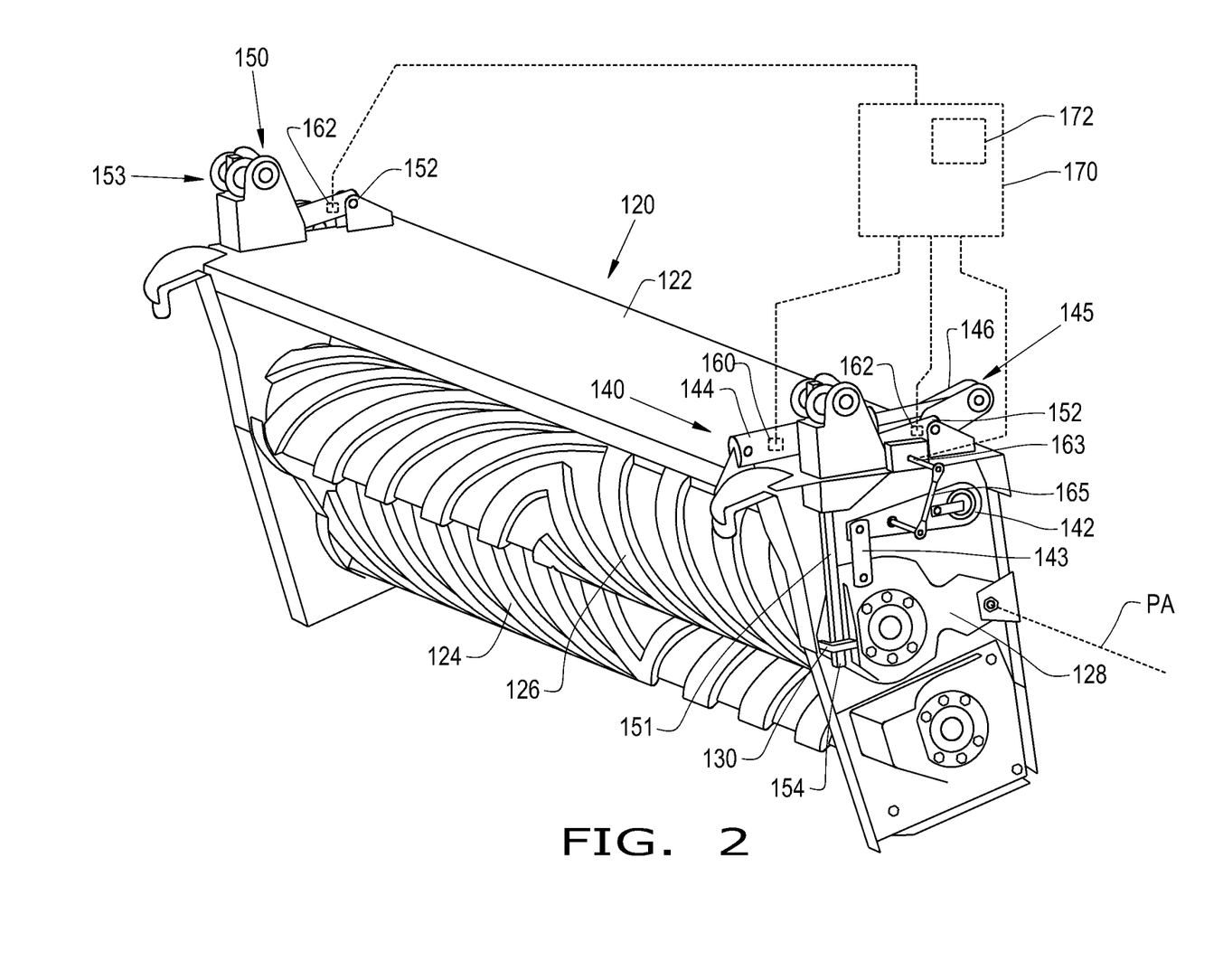
FIG. 2 illustrates a perspective view of the crop conditioning device of FIG. 1, the crop conditioning device including a subframe, conditioning rolls, a tension mechanism, and a roll-gap mechanism.
Figure 3:
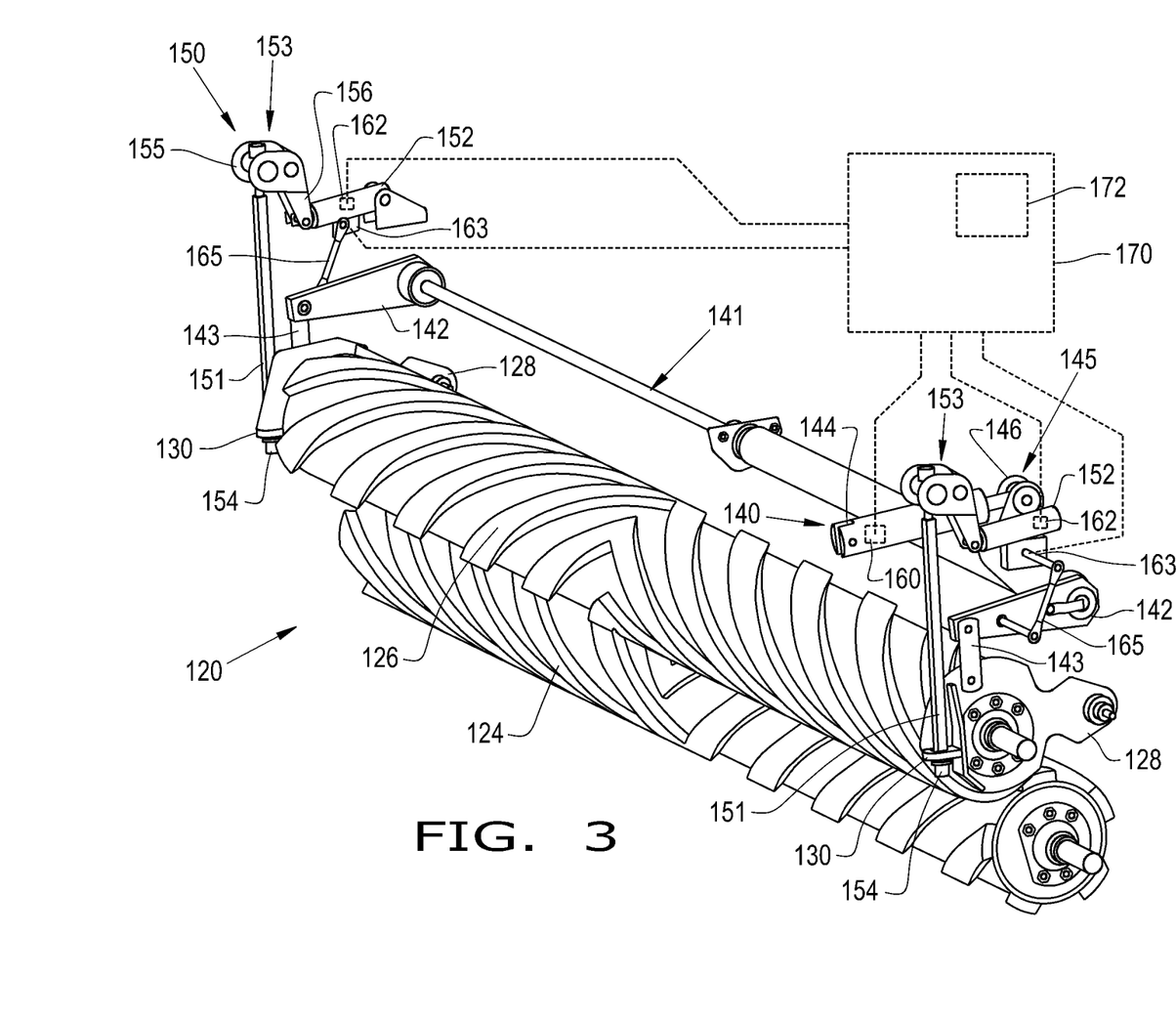
FIG. 3 illustrates a perspective view of the crop conditioning device of FIGS. 1-2 without the subframe.

The crop conditioning device 120 may condition or otherwise crush the crop material to decrease the drying time of the crop material on the field. The crop conditioning device 120 may be located rearwardly, i.e., downstream, of the cutter bar 114. The crop conditioning device 120 generally includes a subframe 122, at least two conditioning rolls 124, 126 connected to the subframe 122, a tension mechanism 140, and a roll-gap mechanism 150. The crop conditioning device 120 may also include one or more sensors 160, 161, 162, 163 which may measure the tension force on the conditioning roll 126 and the size of the roll gap RG in between the paired conditioning rolls 124, 126, and a controller 170 that can automatically set and/or adjust the tension force on the conditioning roll 126 and the roll gap RG. It should be appreciated that the crop conditioning device 120 may be incorporated into any desired agricultural harvesting machine, such as the header 110 or a pull-type mower conditioner.

The subframe 122 may be connected to the main frame 112. The subframe 122 mounts the conditioning rolls 124, 126. The subframe 122 may comprise one or more sheet metal panels, including a top panel and lateral side panels. However, the subframe 122 may comprise any desired material. It should be appreciated, the subframe 122 may be a monolithic or a multicomponent frame.

Figure 5:
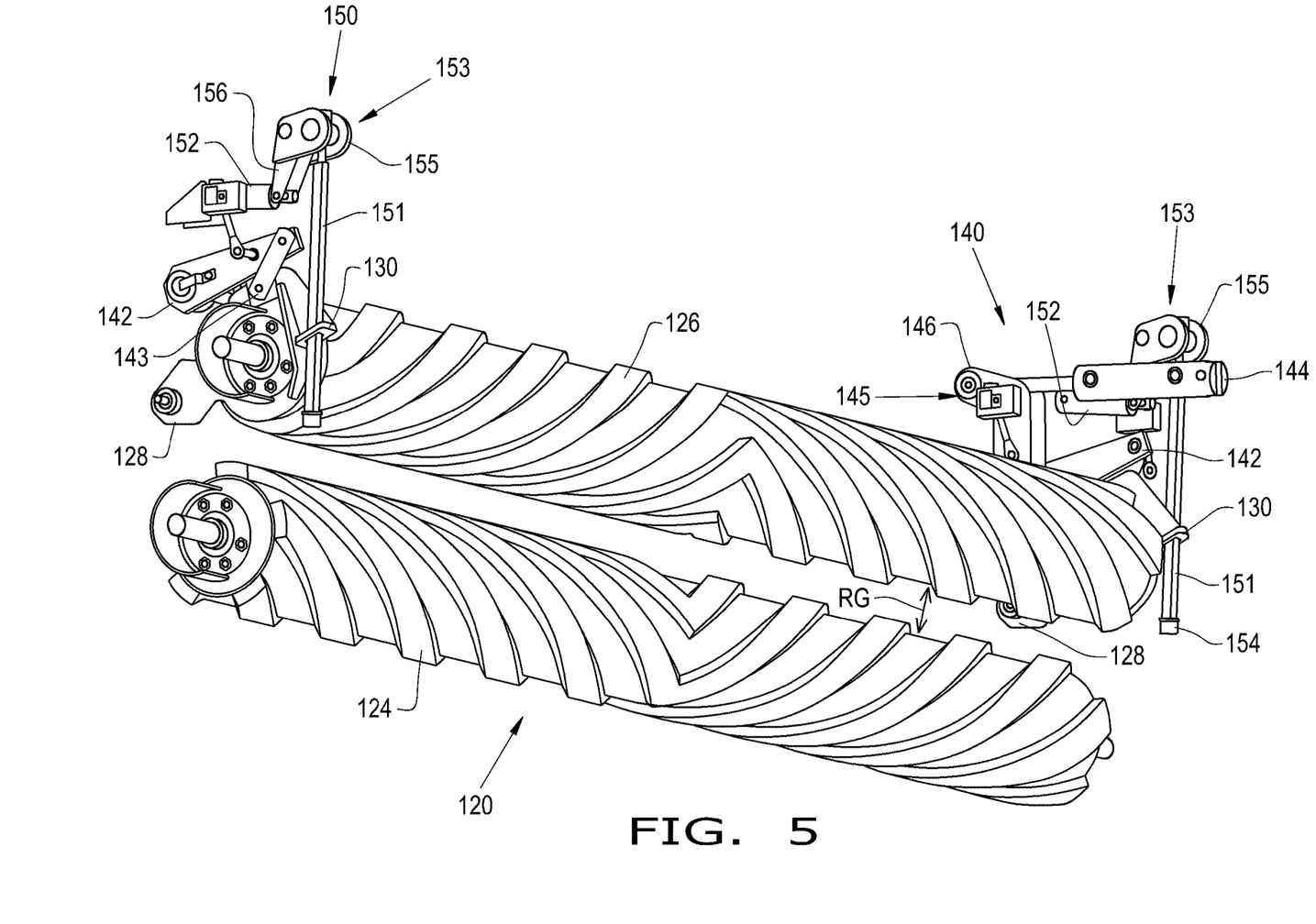
FIG. 5 illustrates a perspective view of the crop conditioning device of FIGS. 1-4, wherein the upper conditioning roll is in a maximum float or open position which is created by the crop mat passing in between the conditioning rolls.

The at least two conditioning rolls 124, 126 may rotate in opposite directions for guiding a mat of crop material through the roll gap RG, as most clearly shown in FIG. 5. The lower conditioning roll 124 may be rotatably and rigidly connected to the subframe 122. In other words, the lower conditioning roll 124 may rotate relative to the subframe 122 but its axis of rotation remains fixed at a given location since it is rigidly connected to the subframe 122. The upper conditioning roll 126 may be rotatably and movably or pivotally connected to the subframe 122. In other words, the upper conditioning roll 126 may rotate relative to the subframe 122 about its axis of rotation, and the upper conditioning roll 126 may also move or pivot such that that its axis of rotation translates upwardly or downwardly in order to adjust the size of the roll gap RG. Thus, the upper conditioning roll 126 is movable relative to the lower conditioning roll 124. As can be appreciated, the lateral distance in between the surfaces of the lower and upper conditioning rolls 124, 126 defines the size of the roll gap RG. Each lateral end of the upper conditioning roll 126 has an end bracket 128, which movably mounts the upper conditioning roll 126 to the subframe 122, for example at a pivot axis PA (FIG. 2). Each end bracket 128 also includes a one-way slider coupling 130 for operably connecting the upper conditioning roll 126 to the roll-gap mechanism 150. It should be appreciated that the lower conditioning roll 124 may be movable instead of or in addition to the upper conditioning roll 126.

The tension mechanism 140 generally includes a tension member 141, tension arms 142, 143, a tension actuator 144 operably connected to the tension member 141 by a linkage mechanism 145, and a biasing member (unnumbered). The tension mechanism 140 sets and adjusts the tension force on the upper conditioning roll 126.

The tension member 141 may be rotated by the tension actuator 144 for applying a desired tension or biasing force onto the tension arms 142, 143, which in turn transmits the tension force onto the upper conditioning roll 126. The tension member 141 is operably connected to the upper conditioning roll 126 by way of the tension arms 142, 143. The tension member 141 may be located above the upper conditioning roll 126. The tension member 141 may be substantially parallel to the upper conditioning roll 126. The tension member 141 may be in the form of a tension or torsion tube. Alternatively, the tension member 141 may be in the form of any desired elongated member(s), such as a multi-section bar. Since the tension member 141 couples the tension arms 142, 143 together, the tension member 141 controls the rotational position of the tension arms 142, 143. The tension member 141 may comprise any desired material, such as stainless steel.

The tension arms 142, 143 operably connect the tension member 141 to the upper conditioning roll 126. The tension arms 142, 143 may include rigid arms 142 and pivot arms 143. The rigid arms 142 are respectively connected to each end of the tension member 141. The pivot arms 143 are respectively and pivotally connected in between the rigid arms 142 and the lateral ends, i.e., end brackets 128, of the upper conditioning roll 126. The tension arms 142, 143 may be in the form of any desired arms, links, or bars. The tension arms 142, 143 may comprise any desired material.

Figure 4:
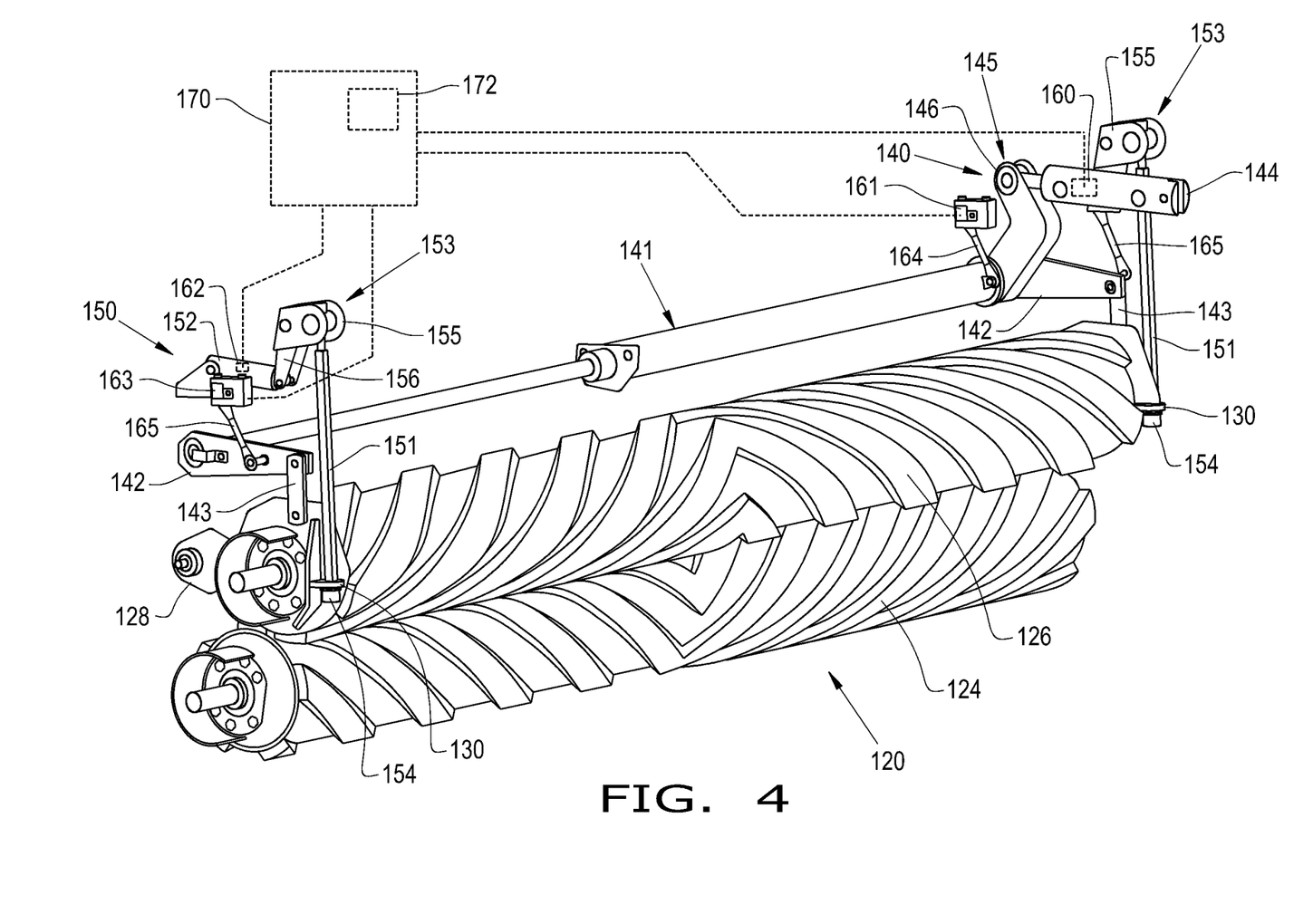
FIG. 4 illustrates a perspective view of the crop conditioning device of FIGS. 1-3, wherein the tension mechanism is applying maximum roll tension on the conditioning rolls.

The tension actuator 144 rotates tension member 141 in order to adjust the tension force applied by the tension member 141 onto the upper conditioning roll 126. The tension actuator 144 is operably connected to the tension member 141 via the linkage mechanism 145. The tension actuator 144 may dually adjust the tension force on the upper conditioning roll 126 and the roll gap RG. In other words, due to the geometry of the tension mechanism 140, tension actuation may rotate the tension arms 142, 143 from a maximum roll tension position to a minimum roll tension position, i.e., maximum roll gap opening setting. In the maximum roll tension position, the conditioning rolls 124, 126 are pushed together with maximum tension member 141 rotation which may in turn creates minimize the roll gap RG. In the minimum roll tension position, the tension arms 142, 143 are rotated to pull the conditioning rolls 124, 126 away from one another which may in turn fully open the roll gap RG. Hence, the tension actuator 144 may rotate the tension arms 142, 143 in a first direction to apply roll tension to the conditioning rolls 124, 126 or a second direction to lift the upper conditioner roll 126 to the position of maximum roll opening, which may be equal to the maximum roll opening possible. This maximum roll opening may be greater than the typical opening from standard operational settings. The tension actuator 144 may be in the form of any desired actuator such as a linear actuator or rotary motor. For example, the tension actuator 144 may be in the form of a hydraulic cylinder 144.

The linkage mechanism 145 converts a linear movement of the tension actuator 144 into a rotational movement for rotating the tension member 141. The linkage mechanism 145 may include one or more links 146. For instance, the linkage mechanism 145 may include a single link 146 that is pivotally connected to the tension actuator 144 at one end and rigidly connected to the tension member 141 at the other end. The link 146 may include an approximate "L"-shape. It should be appreciated that the one or more links 146 may comprise any desired linkage members and any desired material.

The roll-gap mechanism 150 generally includes control rods 151 and roll-gap actuators 152 that are operably connected to the control rods 151 via linkage mechanisms 153. The roll-gap mechanism 150 sets and adjusts the size of the roll gap RG.

The control rods 151 control the sliding or floating movement of the upper conditioning roll 126. The control rods 151 extend vertically in between the linkage mechanisms 153 and the upper conditioning roll 126. The control rods 151 are respectively pivotally connected to the linkage mechanisms 153 at their upper ends. The control rods 151 are respectively and slidably connected to the lateral ends, i.e., end brackets 128, of the upper conditioning roll 126 at their lower ends. More particularly, each control rod 151 extends through an opening of a respective slider coupling 130. Furthermore, each control rod 151 has an end member 154 that engages with the bottom of the respective slider coupling 130. Hence, each end member 154 defines a mechanical stop for setting a bottom limit of travel of the upper conditioning roll 126. In this regard, the structural relationship between the slider couplings 130 and the end members 154 define a one-way floating or sliding movement of the upper conditioning roll 126. Thus, the control rods 151 allow the upper conditioning roll 126 to upwardly float relative to its end members 154 and independent of the roll-gap actuators 152 (FIG. 5). Yet, the substantially vertical travel of control rods 151, through actuation of the roll-gap actuators 152, allows the end members 154 to raise or lower the slider couplings 130 and thereby move or pivot the upper conditioning roll 126. The control rods 151 may be in the form of any desired rods, bars, or links. The end members 154 may be in the form of any desired members that have a greater width or circumference than the body of control rods 151 for engaging with the slider couplings 130. For example, the end members 154 may be in the form of nuts or bulbous end-caps. The control rods 151 may comprise any desired material.

The roll-gap actuators 152 may pivot the upper conditioning roll 126 about its axis PA in order to adjust the roll gap RG. Thereby, the roll-gap actuators 152 may pivot the upper conditioning roll 126 in between a maximum roll gap size (FIG. 5) and a minimum roll gap size (FIG. 4). Each roll-gap actuator 152 is mounted on the subframe 122 at one end and is operably connected to a respective control rod 151 via a linkage mechanism 153 at the other end. The roll-gap actuators 152 are respectively connected to the tension arms 142, 143 only through the control rods 151. The roll-gap actuators 152 are located above, i.e., vertically upward of, the tension arms 142, 143. The roll-gap actuators 152 are independently movable for tilting the upper conditioning roll 126 in a non-parallel configuration relative to the lower conditioning roll 124. In other words, the roll-gap actuators 152 can set the roll gap RG to be at different positions on the left-hand side and the right-hand side of the conditioning rolls 124, 126. Thus, the roll-gap actuators 152 may accommodate an uneven wear on one or both of the conditioning rolls 124, 126. Each roll-gap actuator 152 may be in the form of any desired actuator, such as a linear actuator or a rotary motor. For example, each roll-gap actuator 152 may be in the form of a hydraulic cylinder 152.

As can be appreciated, if the actuators 144, 152 are configured as hydraulic cylinders 144, 152, the crop conditioning device 120 may further include a hydraulic system 180 to independently control the extension and retraction of the hydraulic cylinders 144, 152 (FIG. 1). Hence, the hydraulic system 180 can be fluidly connected to the actuators 144, 152 of the tension and roll-gap mechanisms 140, 150. The hydraulic system 180 may also be operably connected to the controller 170. The hydraulic system 180 may include one or more proportional valves, blocking valves, fluid reservoirs, such as tanks and/or accumulators, and/or hydraulic lines. It should also be appreciated that the actuators 144, 152, along with any component of the hydraulic system 180, may be reconfigured to increase the tension force or the roll gap size in a manner which is reverse to the aforementioned operation thereof depending upon the geometry of the agricultural harvesting machine.

The one or more sensors 160, 161, 162, 163 may include at least one tension sensor 160, 161 associated with the tension actuator 144 and at least one roll-gap sensor 162, 163 associated with each roll-gap actuator 152 (FIGS. 1-4). For example, the at least one tension sensor 160, 161 may include a position sensor 160 located within the tension actuator 144 and/or a position sensor 161, e.g. potentiometer 161, operably connected to the tension member 141 via a link 146 (FIG. 4). The position sensor 160 may sense the position of the tension actuator 144. The potentiometer 161 may measure the rotation of the tension member 141. Also, for example, the at least one roll-gap sensor 162, 163 may include a position sensor 162 located within each roll-gap actuator 152 and/or a position sensor 163, e.g. potentiometer 163, operably connected to each rigid arm 142, via a link 165. Each position sensor 162 may sense the position of its respective roll-gap actuator 152. Each potentiometer 163 may measure the rotational movement of the rigid arm 142, and thereby the translational movement of the upper conditioning roll 126. Upon receiving the signals from the potentiometers 163, the controller 170 may calculate the distance, i.e., roll gap RG, between the conditioning rolls 124, 126 based upon the measured rotation of the rigid arms 142. As can be appreciated, the sensors 160, 161, 162, 163 may be in the form of any desired sensors. It should be appreciated that the one or more sensors may only include the potentiometers 161, 163.

The crop conditioning device 120 may include one or more sensors 166 for detecting the type of crop material being harvested (FIG. 1). As shown, the crop conditioning device 120 includes one crop detection sensor 166. This crop detection sensor 166 may also sense any desired characteristic of the crop material, such as the stem diameter of the crop material. The crop detection sensor 166 may be connected to the mainframe 112 and operably connected to the controller 170. The crop detection sensor 166 may be in the form of any desired sensor, such as an optical sensor. It should be appreciated that the crop conditioning device 120 may or may not include a crop detection sensor 166.

The controller 170 may be operably connected to the tension actuator 144, the roll-gap actuators 152, and/or the sensors 160, 161, 162, 163, 166. The controller 170 may include a memory 172 for storing known tension forces and roll gap sizes associated with an operator's preferences and/or kind of crop being harvested. The controller 170 may be in the form of any desired controller. The controller 170 may be a standalone controller or incorporated into the existing hardware and/or software of the harvester 100.

The controller 170 may conduct an initial set-up procedure of the crop conditioning device 120. The controller 170 may first determine one or more crop material characteristics. For instance, the controller 170 may determine the crop material characteristic(s) by recording one or more corresponding user commands and/or receiving one or more sensed crop material characteristic(s). For example, the operator may select one or more crop material characteristics, i.e., the type, weight, stem diameter, and/or intended use, for example hay or silage, of the crop material. The operator may select the crop material characteristic(s) from a user interface 190, such as a control monitor. Additionally or alternatively, the controller 170 may receive the sensed type of crop material via the crop detection sensor 166. For instance, the controller 170 may compare the imagery captured by the crop detection sensor 166 to known crop characteristics stored in the memory 172 to determine the type of crop material. Thereafter, the controller 170 may retrieve stored data within the memory 172 that indicates relevant information concerning the crop material. For instance, the memory 172 may store the known and averaged stem diameter of a particular type of crop material, and the controller 170 may retrieve the corresponding stem diameter of the crop being harvested from the memory 172. The controller 170 may also receive the sensed stem diameter from the crop detection sensor 166. The controller 170 may also retrieve preloaded operational settings from the memory 172 that are keyed to the type of crop material. For example, the memory 172 may store the archetypal roll gap RG and tension force settings for a particular type of crop material. An archetypal roll gap may be considered a roll gap size which is approximately 40%, plus or minus 20%, of an average stem diameter. Additionally, for example, the memory 172 may store the operator's preferred roll gap RG and tension force settings for a particular type of crop material. Hence, after determining the type of crop material and the relevant characteristics associated therewith, the controller 170 may set the static, initial roll gap size and/or tension force from the data stored in the memory 172. For example, if the operator is harvesting heavy alfalfa and the pre-tested optimum roll gap size is 40% of the stem diameter and the optimum tension setting is 60% of the maximum tension available, the controller 170 may adjust the upper conditioner roll 126 to these preset settings so that mowing can commence without further action on behalf of the operator.

Furthermore, the controller 170 may also set the static, initial roll gap size and/or tension force depending upon one or more operational settings of the crop conditioning device 120, which may be inputted by the operator and/or sensed via one or more corresponding sensors. For example, the controller 170 may set the roll gap size and/or tension force depending upon a position of the swath forming shields of the exit gate, a cutter bar speed, a cutter bar height, a cutter bar angle, a conditioning roll speed, and/or a windrow merger status. For instance, the controller 170 may sense the position of the exit gate via a swath-gate-position sensor and accordingly set a corresponding roll gap size and tension force depending upon the sensed position of the exit gate. As can be appreciated, the position of the exit gate may be determinative of the intended use of the crop material. For instance, a narrow position of the swath forming shields, which forms a narrow swath, may indicate that the crop material will be used as silage. Also, for instance, a wide position of the swath forming shields, which forms a wide swath, may indicate that the crop material will be used as hay. Generally, crop material intended for sileage will have a higher roll gap RG and a lower tension force than crop material intended for hay. Thereby, the controller 170 may accordingly set the roll gap size and/or tension force depending upon the intended use of the crop material, as indicated by the position of the swath forming shields of the exit gate.

The controller 170 may also automatically adjust one or more operational settings. After the initial roll gap size and/or tension force have been set, the controller 170 may use the initial roll gap size and tension force as a starting point for subsequent adjustments. The controller 170 may automatically adjust the tension actuator 144 to set the tension force and the roll-gap actuators 152 to set the roll gap RG upon receiving a further input command from the operator and/or a signal from one or more of the sensors 160, 161, 162, 163. For example, during operation of the crop conditioning device 120, the controller 170 may optimize the conditioning performance by monitoring the operational roll gap and subsequently adjusting the tension force to maintain the desired operational roll gap. The controller 170 may monitor the roll gap size, via one or more of the sensors 160, 161, 162, 163, and calculate at least one roll-gap operational characteristic. For example, the controller 170 may calculate an average deviation and/or a standard deviation of the change in roll gap size as the upper conditioning roll 126 fluctuates up and down during normal operation due to variations in the crop mat. If the roll-gap standard deviation exceeds 50% of the stem diameter, the controller 170 may increase the tension force until the standard deviation falls below 50% and the average roll gap is less than the stem diameter. If the roll-gap standard deviation is low, for example 10-30% of the stem diameter, the controller 170 may decrease the tension force until the roll-gap standard deviation is approximately 50%, plus or minus 20%. Thus, the controller 170 can vary the tension force on the upper conditioning roll 126 to maintain a maximum average roll gap and keep a roll-gap standard deviation below a maximum roll-gap standard deviation to achieve an optimized conditioning quality.

It should be appreciated that the controller 170 may set and subsequently adjust the tension force and the roll gap RG of the tension and roll-gap mechanisms 140, 150 depending upon one or more crop material characteristic(s) and/or operational setting(s), which may be inputted by the operator and/or sensed via corresponding sensors. Hence, the controller 170 may set and subsequently adjust the tension force and roll gap RG depending upon the type, weight, stem diameter, and/or intended use of the crop material, the calculated roll-gap operational characteristic(s), the position of the swath forming shields of the exit gate, the cutter bar speed, the cutter bar height, the cutter bar angle, the conditioning roll speed, and/or the windrow merger status.

Additionally, the controller 170 may calibrate the tension mechanism 140 and the roll-gap mechanism 150. For instance, the controller 170 may perform a calibration procedure prior to, during, and/or after the operation of the crop conditioning device 120 in order to set the roll gap RG and tension on the conditioning rolls 124, 126. This calibration procedure may be performed as an initial calibration of the tension and roll-gap mechanisms 140, 150, prior to any wear on the conditioning rolls 124, 126. Additionally, this calibration procedure may be performed in order to compensate for wear on one or both of the conditioning rolls 124, 126. Furthermore, this calibration procedure may be performed to reset the tension and roll-gap mechanisms 140, 150 after replacing one or more parts of the crop conditioning device 120. This calibration strategy may take place prior to and/or during operation of the crop conditioning device 120 in order to set the roll gap RG. For example, if the crop conditioning device 120 is equipped with a hydraulic system 180 and hydraulic cylinders 144, 152, the controller 170 may calibrate the system using the following calibration strategy. The controller 170 may open the corresponding hydraulic valves to allow the pressure in the tension and the roll-gap hydraulic cylinders 144, 152 to return to the fluid reservoir. This action may accordingly allow the upper conditioning roll 126 to lower and rest on the lower conditioning roll 124, creating a zero roll gap size. This action may also allow the tension arms 142, 143 to release any biasing force and return to a zero-tension force position. The controller 170 may then record the corresponding position of the tension sensor(s) 160, 161. Thereafter, the controller 170 may fully retract the tension cylinder 144, while the roll-gap cylinders 152 remain open to the fluid reservoir, to impart a maximum tension force on the upper conditioning roll 126 at the zero roll gap size. The controller 170 may then record the maximum tension force and the position of the tension member 141 at this fully rotated, maximum tension position, i.e., the fully retracted position of the tension cylinder 144. Additionally therewith, the controller 170 will record the positions of the position sensors 163 as a zero roll gap position. Then, the controller 170 may fully extend the tension cylinder 144, removing all tension force on the conditioning rolls 124, 126 and accordingly rotating the upper conditioning roll 126 up and away from the lower conditioning roll 124 to the maxim roll opening position. This maximum roll opening position is recorded by the controller 170 and represents the maximum roll opening possible during operation. The controller 170 may then calculate the roll position based upon the sensor positions and the fixed geometry of the system. The roll gap setting is calibrated by returning the tension cylinder 144 to its maximum retraction position, i.e., maximum roll tension, and then fully extending the roll-gap cylinders 152, with the position of the roll-gap sensors 163 being saved at this maximum roll gap setting. It is noted that the maximum roll gap setting is not the same as the maximum roll opening. The roll gap setting may be limited to approximately 1 inch (2.54 centimeter) of roll gap size between the conditioning rolls 124, 126. Yet, the upper conditioning roll 126 is able to open, e.g. move upwardly, up to more than approximately 3 inches (7.62 centimeters) during the aforementioned calibration strategy or during operation, wherein the roll gap between the conditioning rolls 124, 126 is controlled by the thickness of the crop mat moving between the conditioning rolls 124, 126. Therefore, the aforementioned calibration strategy, when performed regularly, such as during the first start-up of the day, will compensate for wear on the surface of the conditioning roll(s) 124, 126 through the life thereof while also compensating for wear in the connections between the conditioning rolls 124, 126 and the various other components.

After calibration, the controller 170 may set the roll gap with the following procedure. The controller 170 may fully retract the tension cylinder 144, providing maximum roll tension during the setting of the roll gap RG. The controller 170 may then extend the roll-gap cylinders 152 to a desired position, using the roll-gap sensors 163 as an input for roll position. When the desired position is achieved, one or both of the roll-gap cylinders 153 may be locked in position to hold this roll gap RG. The controller 170 may determine the desired tension force based upon the tension bar spring rate and tension tube rotation. For instance, the controller 170 may subtract the tension bar "preload" induced by the opening of the roll gap RG by the roll-gap cylinders 152 to the previously set position.

Figure 6:
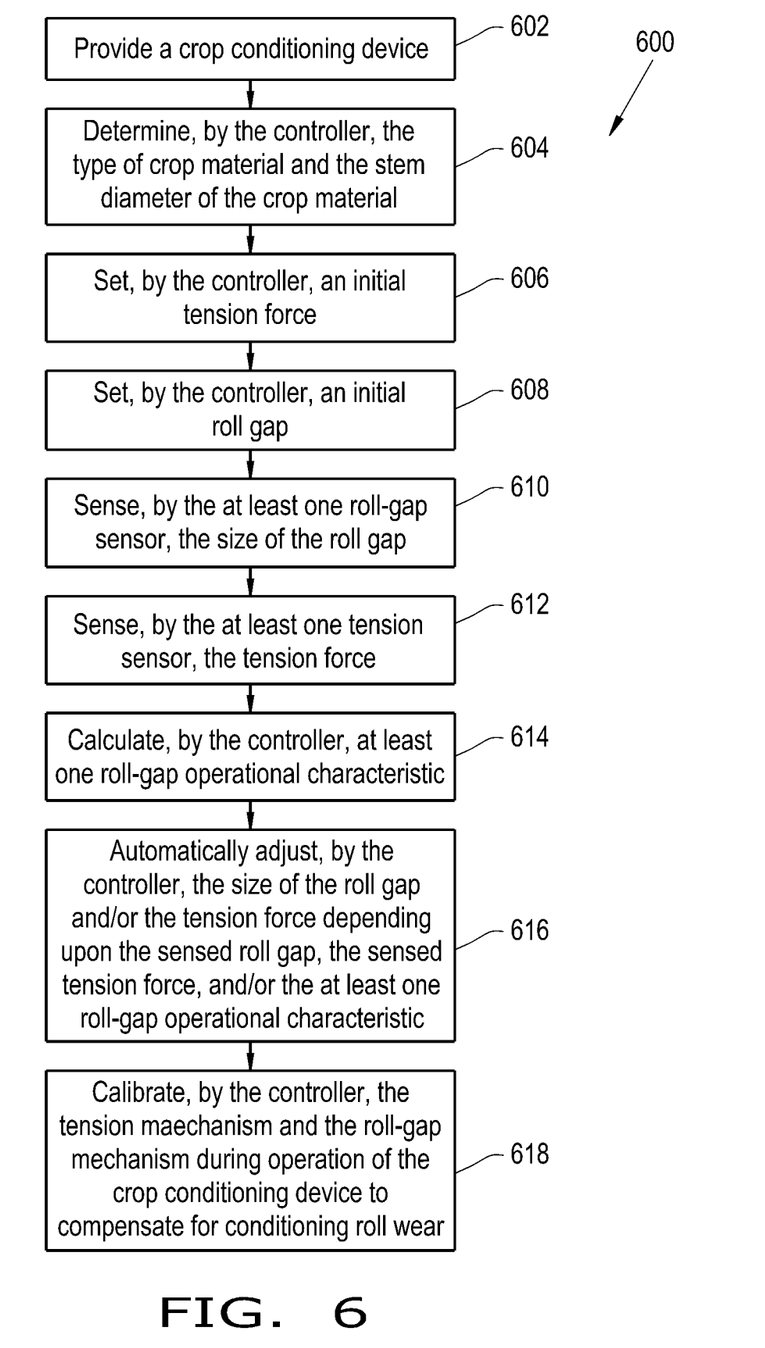
FIG. 6 illustrates a flow chart of a method for operating the crop conditioning device, in accordance with an exemplary embodiment of the present invention.

Referring now to FIG. 6, there is shown a flowchart of a method 600 for operating an agricultural harvesting machine, such as a self-propelled windrower 100 with a header 110 or a pull-type mower conditioner. The method 600 includes an initial step of providing a crop conditioning device 120, as discussed above (at block 602). The controller 170 may initially determine the type of crop material and the stem diameter by way of receiving an inputted operator command and/or directly sensing the crop material, as discussed above (at block 604). The method 600 may also include determining, by the controller 170, at least one operational setting. For instance, the controller 170 may determine the rotational speed of the conditioning rolls, the conditioning roll gap size, the tension force on the conditioning rolls, the position of the swath forming shields of the exit gate, the cutter bar speed, the cutter bar height, the cutter bar angle, and/or the windrow merger status. Thereafter, the controller 170 may set the initial tension force depending upon one or more crop material characteristics and/or operational settings (at block 606). For instance, the controller 170 may set the initial tension force on the upper conditioning roll 126 dependent upon the type of crop material and/or at least one operational setting. The controller 170 may set the initial roll gap depending upon one or more crop material characteristics and/or operational settings (at block 608). For instance, the controller 170 may set the initial roll gap depending the type of crop material. As can be appreciated, the initial tension force and the initial roll gap may be predetermined values based upon prior testing for optimized conditioning quality and/or the operator's preferred settings. During operation of the crop conditioning device 120, the sensors 162, 163 may sense the roll-gap (at block 610). Also, concurrently therewith, the sensor(s) 160, 161 may sense the tension force (at block 612). The controller 170 may calculate at least one roll-gap operational characteristic (at block 614). For example, the controller 170 may calculate an average deviation and/or a standard deviation of the change in roll gap size as the upper conditioning roll 126 fluctuates up and down during normal operation due to variations in the crop mat. Thereafter, the controller 170 may automatically adjust the size of the roll gap and/or the tension force depending upon the sensed roll gap, the sensed tension force, and/or the at least one roll-gap operational characteristic (at block 616). The method may also include a step of calibrating the tension mechanism 140 and the roll-gap mechanism 150 (at block 618). For example, at the start of the harvesting operation or throughout the harvesting operation, the controller 170 may perform the calibration strategy, as discussed above.

It is to be understood that the steps of the method 600 may be performed by the controller 170 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 170 described herein, such as the method 600, is implemented in software code or instructions which are tangibly stored on a tangible computer readable medium. The controller 170 loads the software code or instructions via a direct interface with the computer readable medium or via a wired and/or wireless network. Upon loading and executing such software code or instructions by the controller 170, the controller 170 may perform any of the functionality of the controller 170 described herein, including any steps of the method 600 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A crop conditioning device for an agricultural harvesting machine, comprising:
 a frame;
 a first conditioning roll connected to the frame;
 a second conditioning roll connected to the frame such that the second conditioning roll is movable relative to the first conditioning roll, the second conditioning roll being located at a distance away from the first conditioning roll for defining a roll gap in between the first conditioning roll and the second conditioning roll, the first conditioning roll and the second conditioning roll being configured for conditioning a crop material;
 a tension mechanism connected to the second conditioning roll, the tension mechanism comprising a first tension arm coupled to a first side of the second conditioning roll, a second tension arm coupled to a second side of the second conditioning roll, a tension member extending between the first tension arm and the second tension arm, and a tension actuator operably connected to the tension member, the tension member being configured for applying a tension force on the second conditioning roll via the first and second tension arms, and the tension actuator being configured for adjusting the tension force applied by the tension member;
a roll-gap mechanism connected to the second conditioning roll, the roll-gap mechanism being configured for moving the second conditioning roll to adjust the roll gap; and
a controller operably connected to at least one of the tension mechanism and the roll-gap mechanism, the controller being configured for automatically setting at least one of an initial tension force and an initial roll gap dependent upon at least one of a type of crop material and at least one operational setting.

2. The crop conditioning device of claim 1, further comprising at least one roll-gap sensor operably connected to the roll-gap mechanism and the controller, the at least one roll-gap sensor being configured for sensing a size of the roll gap and providing a roll-gap signal to the controller.

3. The crop conditioning device of claim 2, further comprising at least one tension sensor operably connected to the tension mechanism and the controller, the at least one tension sensor being configured for sensing the tension force and providing a tension signal to the controller.

4. The crop conditioning device of claim 3, wherein the controller is further configured for automatically adjusting the size of the roll gap relative to the initial roll gap and dependent upon the roll-gap signal and the tension force relative to the initial tension force and dependent upon the tension signal.

5. The crop conditioning device of claim 4, wherein the controller is further configured for calculating at least one roll-gap operational characteristic, and wherein the controller is configured for automatically adjusting the tension force dependent upon the at least one roll-gap operational characteristic and a stem diameter of the crop material.

6. The crop conditioning device of claim 1, wherein the at least one operational setting comprises at least one of a position of swath forming shields of an exit gate, a cutter bar speed, a cutter bar height, a cutter bar angle, a conditioning roll speed, and a windrow merger status.

7. The crop conditioning device of claim 1, wherein the roll-gap mechanism comprises a pair of control rods respectively movably connected to the second conditioning roll and a pair of roll-gap actuators respectively and operably connected to the pair of control rods, the pair of roll-gap actuators being configured for moving the second conditioning roll to adjust the roll gap.

8. The crop conditioning device of claim 7, wherein each end of the second conditioning roll comprises a slider coupling, wherein the slider couplings slidably connect the second conditioning roll to the pair of control rods.

9. The crop conditioning device of claim 8, wherein each control rod of the pair of control rods comprises an end member for engaging with a respective slider coupling, each of the end members defining a mechanical stop for setting a bottom limit of travel of the second conditioning roll.

10. A method for operating an agricultural harvesting machine, comprising:
providing a crop conditioning device for the agricultural harvesting machine, the crop conditioning device comprising a frame, a first conditioning roll connected to the frame, a second conditioning roll connected to the frame such that the second conditioning roll is movable relative to the first conditioning roll, the second conditioning roll being located at a distance away from the first conditioning roll for defining a roll gap in between the first conditioning roll and the second conditioning roll, the first conditioning roll and the second conditioning roll being configured for conditioning a crop material, a tension mechanism connected to the second conditioning roll, the tension mechanism comprising a first tension arm coupled to a first side of the second conditioning roll, a second tension arm coupled to a second side of the second conditioning roll, a tension member extending between the first tension arm and the second tension arm, and a tension actuator operably connected to the tension member, the tension member being configured for applying a tension force on the second conditioning roll via the first and second tension arms, and the tension actuator being configured for adjusting the tension force applied by the tension member, a roll-gap mechanism connected to the second conditioning roll, the roll-gap mechanism being configured for moving the second conditioning roll to adjust the roll gap, and a controller operably connected to at least one of the tension mechanism and the roll-gap mechanism;
determining, by the controller, a type of crop material and a stem diameter of the crop material; and
setting, by the controller, at least one of:
an initial tension force dependent upon the type of crop material by adjusting the tension actuator operably connected to the tension member extending between the first tension arm and the second tension arm; and
an initial roll gap dependent upon the type of crop material.

11. The method of claim 10, wherein crop conditioning device further comprises at least one roll-gap sensor operably connected to the roll-gap mechanism and the controller, wherein the method further comprises a step of sensing, by the at least one roll-gap sensor, a size of the roll gap and providing a roll-gap signal to the controller.

12. The method of claim 11, wherein crop conditioning device further comprises at least one tension sensor operably connected to the tension mechanism and the controller, wherein the method further comprises a step of sensing, by the at least one tension sensor, the tension force and providing a tension signal to the controller.

13. The method of claim 12, wherein, after the steps of setting the initial tension force and the initial roll gap, the method further comprises a step of adjusting, by the controller, the size of the roll gap relative to the initial roll gap and dependent upon the roll-gap signal and the tension force relative to the initial tension force and dependent upon the tension signal.

14. The method of claim 13, further comprising a step of calculating at least one roll-gap operational characteristic and automatically adjusting, by the controller, the tension force dependent upon the at least one roll-gap operational characteristic and the stem diameter of the crop material.

15. The method of claim 10, further comprising a step of calibrating, by the controller, the tension mechanism and the roll-gap mechanism.

16. The method of claim 10, wherein the roll-gap mechanism comprises a pair of control rods respectively movably connected to the second conditioning roll and a pair of roll-gap actuators respectively and operably connected to the pair of control rods, the pair of roll-gap actuators being configured for moving the second conditioning roll to adjust the roll gap.

17. The method of claim 10, further comprising a step of determining, by the controller, at least one operational setting, wherein the step of setting the initial tension force by the controller is further dependent upon the at least one operational setting, and wherein the step of setting the initial roll gap by the controller is further dependent upon the at least one operational setting.

18. The method of claim 17, wherein the at least one operational setting comprises at least one of a position of swath forming shields of an exit gate, a cutter bar speed, a cutter bar height, a cutter bar angle, a conditioning roll speed, and a windrow merger status.

\* \* \* \* \*